United States Patent

[11] 3,589,700

[72] Inventors  Jean Ruet;
 Jean-Pierre Serpette; Jacques Pierre; Jean Jacques Carduner; Michel Lietard; Jacques Remaud, all of Billancourt, France
[21] Appl. No. 728,623
[22] Filed May 13, 1968
[45] Patented June 29, 1971
[73] Assignees Regie National Des Usines Renault
 Billancourt, France;
 Automobiles Peugeot
 Paris, France
[32] Priority May 17, 1967, Nov. 23, 1967, Nov. 24, 1967, Jan. 30, 1968
[33] France
[31] 106,721, 129,398, 129,538 and 137,991

[54] FLEXIBILITY CORRECTOR FOR VEHICLE SUSPENSION
 11 Claims, 18 Drawing Figs.
[52] U.S. Cl. .................................................. 267/11,
 267/20, 267/57, 280/124
[51] Int. Cl. ..................................................... B60g 17/02

[50] Field of Search ............................................. 280/124,
 124.3, 104; 267/11, 57

[56] References Cited
 UNITED STATES PATENTS
 2,911,231 11/1959 Allison .......................... 280/104
 3,278,197 10/1966 Gerin ............................ 280/124

Primary Examiner—A Harry Levy
Attorney—Stevens, Davis, Miller & Mosher

ABSTRACT: A flexibility corrector for a vehicle suspension system, which comprises a resilient member mounted between suspension elements movable in relation to each other and adapted to reduce the suspension flexibility when the suspension departs from its mean position, said corrector being characterized in that said resilient member is mounted in a state of unstable equilibrium in said mean position of the suspension, whereby the force applied to the suspension when the latter departs from said mean position tends to accentuate this deviation.

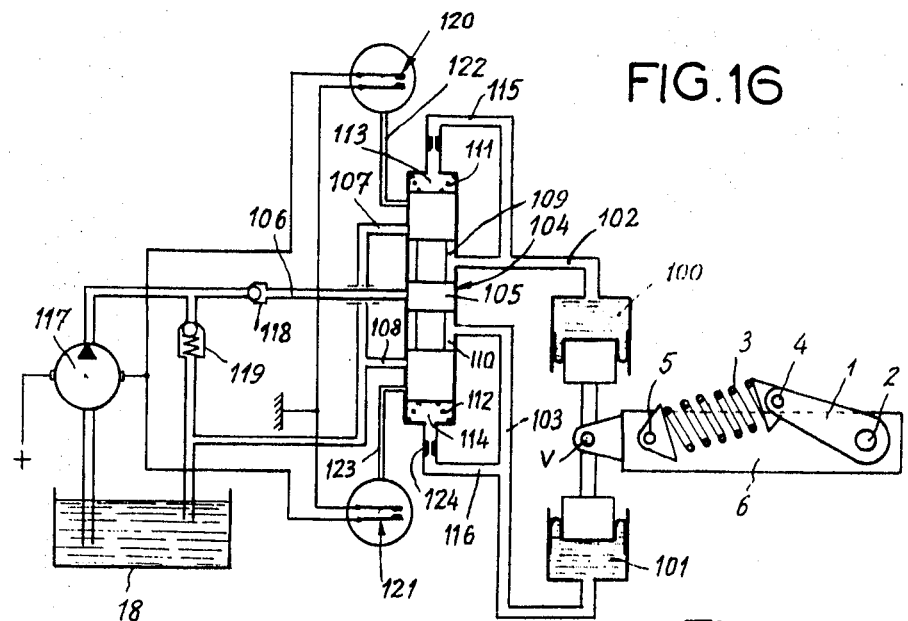
FIG.16
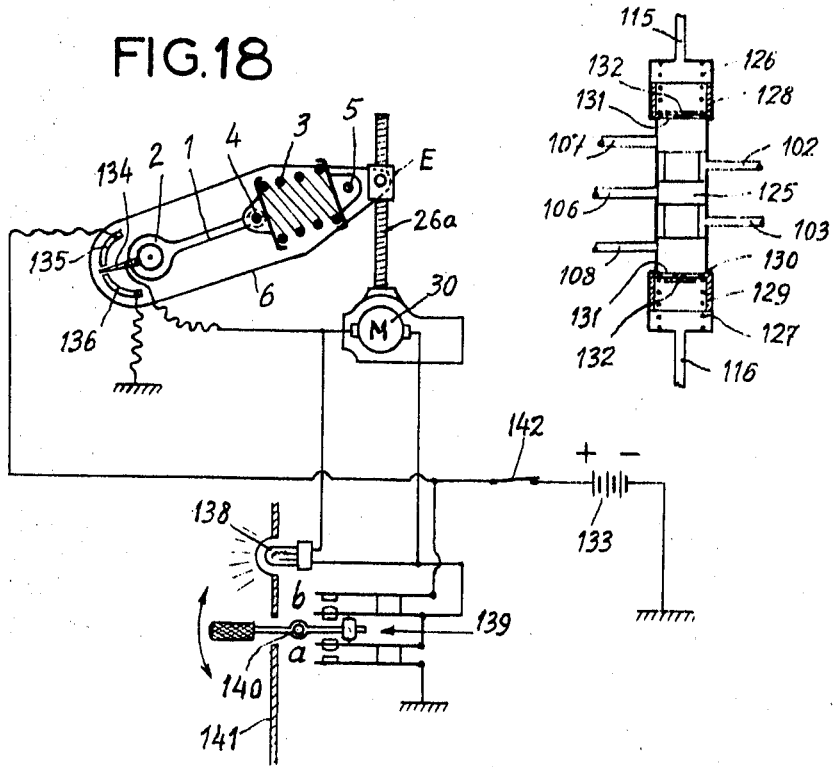
FIG.17
FIG.18

FLEXIBILITY CORRECTOR FOR VEHICLE SUSPENSION

The present invention relates to a vehicle suspension corrector device designed for completing a conventional suspension in order to impart a great and variable flexibility thereto.

It is known that the choice of the optimum flexibility of the suspension of a vehicle results as a rule from a compromise between the requirements of suspension comfort (the latter increasing with flexibility) and those of the amplitude of movement between the sprung and unsprung portions of the vehicle, this amplitude being necessarily limited and requiring a relatively great stiffness to avoid striking the bottom at maximum deflection or rebound in case of static or dynamic changes in the vehicle load.

Constant-flexibility suspension systems constitute but a poor compromise between these conflicting requirements. Variable-flexibility suspension systems, of which many examples are well known, provide a far better solution since they enable the suspension to operate with a great flexibility in the vicinity of its mean position which is that of static equilibrium, and with a decreasing flexibility when it departs from this position as a consequence of movements caused by road irregularities.

Since the position of static equilibrium varies with the vehicle load, it is also advantageous, in order to take full advantage of the properties of a variable-flexibility suspension, to correct the adjustment thereof in a manner such that the point of operation giving the maximum flexibility be coincident with the position of static equilibrium for each load value, irrespective of this load.

It is already known to use for this purpose a flexibility corrector complementary to the main suspension, which consists of at least one linear elastic member tending to assume a stable equilibrium because it acts in the proper direction to restore the suspension to its mean position. Under these conditions, the corrector operates by adding its inherent stiffness to the stiffness of the main suspension of which the flexibility must be selected to have the high value desirable for ensuring the maximum comfort. A typical example of a corrector characterized by a self-regulating feature and by the capacity of automatically adjusting the suspension operation at its maximum flexibility in the position of static equilibrium, irrespective of the load, is described and shown in the French Pat. No. 1,164,033 of Dec. 27, 1956, in the name of REGIE NATIONALE DES USINES RENAULT.

The flexibility corrector for vehicle suspension according to this invention comprises a resilient member mounted between the suspension elements which are movable in relation to each other in order to reduce the flexibility of the suspension when it departs from its mean condition, and is essentially characterized in that said resilient member is mounted in a state of unstable equilibrium in said mean condition of the suspension, whereby the effort exerted by this member on the suspension in case of deviation from said mean condition tends to accentuate said deviation.

Thus, the inherent stiffness of the corrector is subtracted from that of the main suspension; in other words, the main advantage resulting from this arrangement is to provide, in the mean position, a total flexibility which is no more equal but greater than that of the main suspension. As a result, this main suspension can be constructed according to the conventional technique, whereas a high-flexibility suspension is attended by considerable constructional difficulties when metal springs are used, and cannot be obtained unless pneumatic "spring" means are resorted to.

This invention is also concerned with various forms of embodiment of this corrector and of servo means designed for maintaining said resilient member in its state of unstable equilibrium in the position of static equilibrium of the suspension.

Various forms of embodiment of the invention will now be described by way of example with reference to the accompanying drawings, in which:

FIG. 16 is a diagrammatic illustration of a corrector according to this invention having automatic hydraulic control means;

FIG. 17 is a detail view showing a typical form of embodiment of a fluid distributor in a hydraulic control system of the type illustrated in FIG. 16, and FIG. 18 is a diagrammatic view showing a servomechanism comprising an electric motor and a manual control system.

Figure 2:
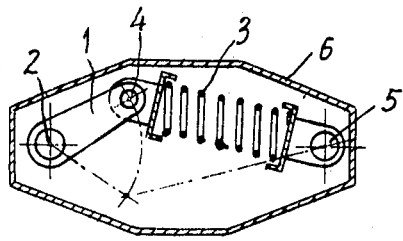
FIG. 2 illustrates diagrammatically a specific form of embodiment of a corrector according to this invention.

Referring first to the form of embodiment shown in FIG. 2, the corrector device consists essentially of a lever 1 connected to the vehicle suspension so as to oscillate about a pivot 2 as a function of the suspension deflection and rebound, said lever 1 coacting with a resilient member constantly urging same on either side of a position of unstable equilibrium whereat the stress axis of the member passes through said pivot 2, said position corresponding to the mean condition of the suspension. As illustrated in FIG. 2, this resilient member may consist of a coil compression spring 3 compressed between two straps articulated the one through a pivot 4 on the lever 1 and the other through a pivot 5 which, like pivot 2, is supported by the sprung portion of the vehicle. Thus the spring 3 applies to the lever 1 a torque about the pivot 2 whenever the axis of pivots 2, 4 and 5 are not aligned; a protection case 6 may be provided if desired.

Figure 1:
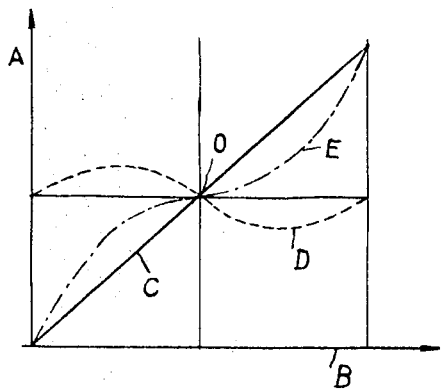
FIG. 1 is a diagram illustrating the flexibility of a suspension according to this invention.

In the diagram illustrated in FIG. 1 the loads are plotted in ordinates along line A and the abscissa B denotes the suspension movement; the flexibility of the main suspension is shown by the curve C, and E denotes the resultant flexibility curve obtained by associating the main suspension and the corrector, the point O of this diagram corresponding to the mean position of the suspension under normal load conditions. It will be seen that with this corrector a total flexibility greater than that of the main suspension is obtained.

Different methods of associating this corrector or variations thereof with the suspension of a vehicle will now be described by way of illustration, it being understood that the present invention should not be construed as being limited by these specific forms of embodiment.

Figure 3:
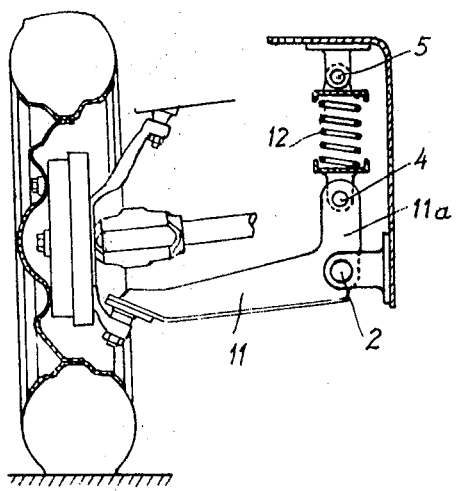
FIGS. 3 to 5 are views showing different types of independent-wheel suspensions equipped with a corrector according to this invention.

In the exemplary independent wheel suspension system illustrated in FIG. 3, the lower transverse wheel carrier arm 11 has an integral substantially perpendicular upper extension 11a and the compression coil spring 12 constituting the suspension corrector extends vertically thereabove. Other orientations of the lever may of course be contemplated according to the space available in the vehicle.

Figure 4:
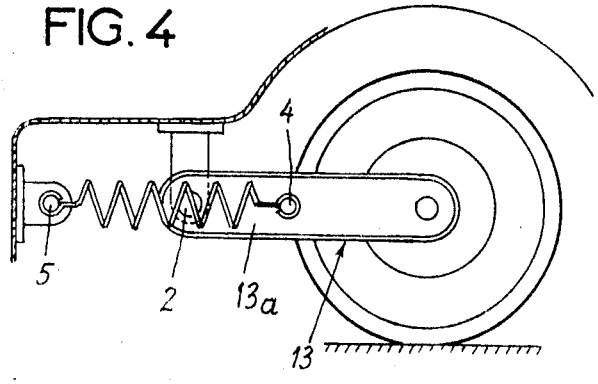

In the modified form of embodiment of an independent wheel suspension illustrated in diagrammatic fragmentary view in FIG. 4 the lever consists of a portion 13a of a longitudinal wheel carrier arm 13 and the corrector spring is a tension spring.

Figure 5:
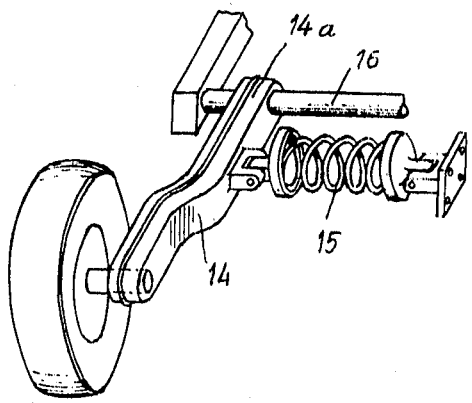

In the independent wheel suspension arrangement illustrated in FIG. 5 comprising a longitudinal wheel carrier arm 14 and the corrector coil compression spring 15 which is mounted parallel to the axis of oscillation 16 of said arm in the mean position of the suspension, so that this spring, outside said mean position, will constantly urge the arm 14 upwards or downwards, the arm portion 14a being the equivalent of the aforesaid lever 1. To avoid the transverse component on the arm as a result of the compression of the corrector spring, two identical springs may be disposed on either side of the arm.

It will be seen that in all the examples described hereinabove the spring means of the so-called main suspension is not illustrated, since it can be of any conventional type (coil spring, torsion bar, pneumatic, etc.) without departing from the spirit and scope of the invention.

Figure 6:
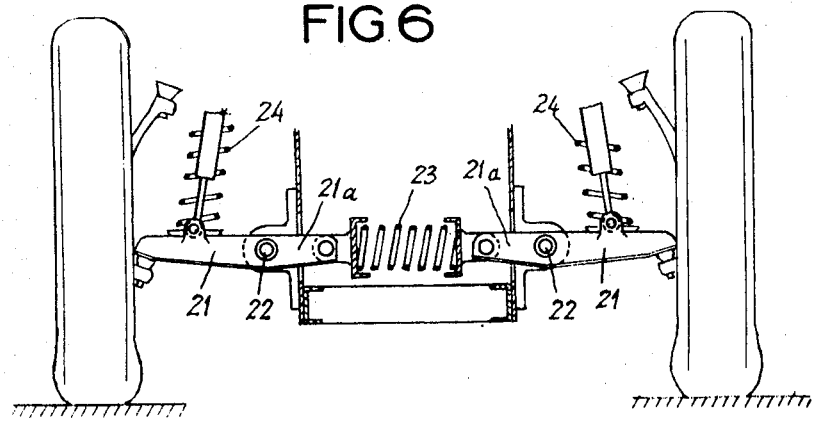
FIG. 6 is a front view of an independent wheel suspension with a corrector common to the two wheels of the axle concerned.

In the foregoing only the case wherein the corrector acts upon the suspension of a single wheel has been contemplated. It may be advantageous to cause this corrector to be effective upon the two wheels of a same axle or train. A typical example of an arrangement of this character is illustrated in FIG. 6 showing a train of independent wheels of which the suspension comprises for each wheel a lower transverse carrier arm 21 comprising in this case an extension forming a lever 21a beyond its pivot pin 22, and a common corrector spring 23 of the coil compression type is interposed with articulated bearings between the two levers 21a. In this example the coil springs 24 are those of the main suspension.

Figure 7:
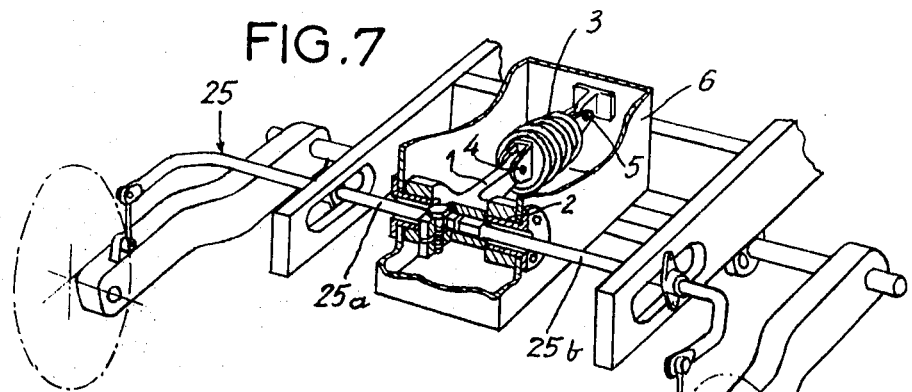
FIG. 7 is a diagrammatic perspective view showing an axle suspension with a single corrector for the axle.

Another form of embodiment is illustrated in FIG. 7, in the case of a suspension for a train of wheels which comprises an antiroll bar 25 as currently used, this bar having coupled to its mid portion a lever 1 of a corrector similar to that illustrated in FIG. 2; therefore, the equivalent component elements of this corrector are designated by the same reference numerals. The antiroll bar 25 actually consists in this example of two half-bars 25a and 25b assembled end to end inside the big-end like articulation 2 of lever 1 with which they are rotatably coupled by the mutual engagement of polygonal-sectioned portions.

In this case, the corrector is effective during a rolling movement only when the train of wheels is asymmetrically loaded. In fact, when the sprung portion is inclined for example in a curve, the symmetry of the reactions of the antiroll bar neutralizes any action exerted by the corrector device.

Figure 11:
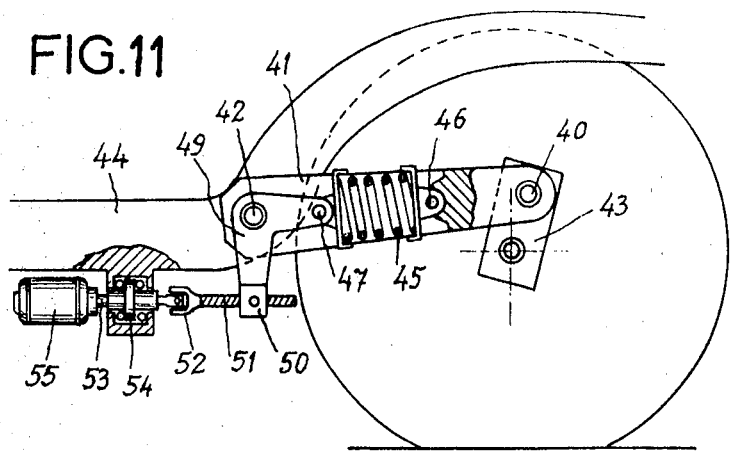
FIG. 11 is a fragmentary sectional view showing the same suspension equipped with a corrector.
Figure 10:
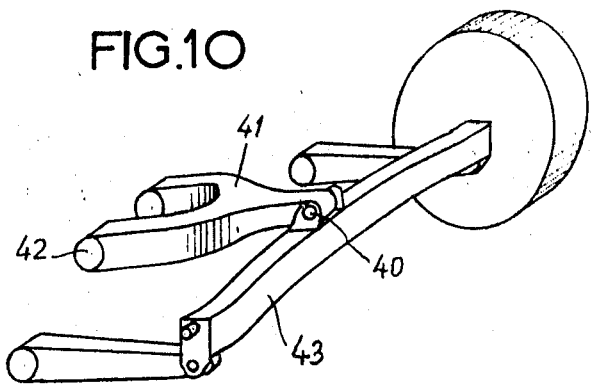
FIG. 10 illustrates diagrammatically in perspective view an axle suspension to which the form of embodiment of FIG. 11 is applicable.
Figure 12:
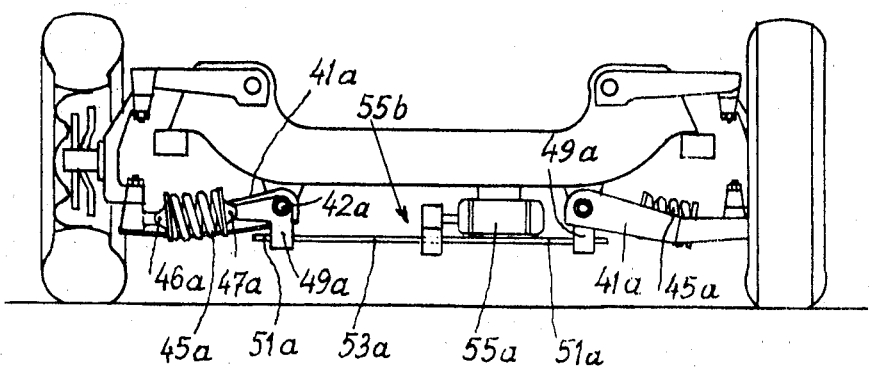
FIG. 12 is a front view of an independent front suspension equipped with correctors incorporated in the lower wheel carrier arm.

FIGS. 10 to 12 of the drawing illustrate the application of the corrector device of this invention to suspension systems comprising wheel suspension arms of the wishbone or fork type and wherein the elastic element of the corrector is a coil compression spring mounted within the suspension arm with an end bearing articulated near the vertex or small end of the wishbone, and another end bearing located nearer and offset in relation to the pivot of the suspension arm, so that the spring acts as a corrector while being associated with the suspension with reduced with reduced overall dimensions.

In the axle suspension system illustrated in FIGS. 10 and 11 the central suspension arm 41 pivoted on the one hand at 40 to the middle point of axle 43 and on the other hand to the frame 44 of the vehicle acts at the same time like the lever 1 of the above-described flexibility corrector.

Mounted within the wishbone or forklike arm 41 is a coil compression spring 45 constituting the corrector having its end bearings pivoted to the arm 41 at 46 and 47, respectively, this last pivot being offset in relation to the pivot 42 and normally held in a fixed position in relation to the frame, so that in the static condition of the suspension the pivots 42, 46 and 47 are aligned, the suspension being in this case in the intermediate position of its maximum flexibility.

It will be noted that the corrector spring is thus common to the two left-hand and right-hand wheels of the train, and remains inoperative in case of pure rolling movements, as desirable, since it is located centrally of the axle.

FIG. 12 illustrates the combination of separate spring correctors 45a with the conventional lower wishbone arms 41a of an independent wheel front suspension. Each spring 45a is compressed between a bearing pivoted at 46a towards the oscillating vertex or small end of the wishbone arm connected to the stub-axle of the relevant wheel, and another bearing pivoted at 47a to a pivot offset in relation to the pivot 42a having the wishbone 41a articulated thereon. The pivot 47a is carried in this example by an arm of a bellcrank lever 49a fulcrumed about a pivot 42a and held in position as will be described presently.

If in addition it is desired to cause these corrector devices to operate strictly about their position of unstable equilibrium (with points 2, 4 and 5, or 42, 46 and 47 aligned) this alignment must be adjusted as a function of the static load of the vehicle, which of course varies according to the specific use of the vehicle; in other words, when the vehicle is stationary the corrector device must be in a position of unstable equilibrium.

This requirement can be met by shifting one of the pivots, notably the one not responsive to the deflection and rebound movements of the suspension, namely pivot 5 in the first examples, or pivots 47 and 47a in the examples illustrated in FIGS. 11 and 12.

Figure 8:
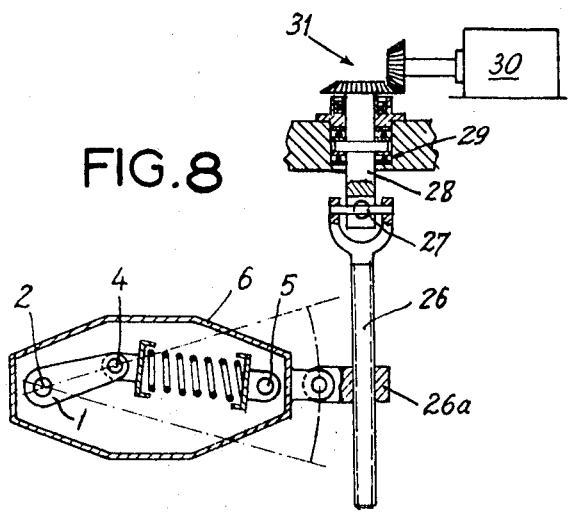
FIGS. 8 and 9 are other views showing a corrector according to this invention, which has a servoregulator associated therewith.

This particular arrangement is illustrated in FIG. 8 illustrating a servomechanism designed for causing the casing 6 (containing the corrector element) to revolve about the pivot 2 connected to the frame of the vehicle. A not 26a connected to the pivot carried by said casing 6 is engaged by a screw rod 26 connected through a universal joint 27 to a driving shaft 28 reacting against a thrust bearing 29. An electric motor 30 drives the shaft 28 through a reducing level gearing 31. This motor 30 is adapted to be started in either direction by adequate contact means (not shown), either responsive for example to the level of the suspension system through any suitable means and capable of restoring said pivot 5 in alignment with pivots 2 and 4, or carried by the members articulated at 4 so as to detect the desired alignment thereof.

Of course, this electric motor 30 may be replaced by any other suitable source of power, such as a hydraulic motor, a power takeoff on the engine or from the wheels, etc.

Figure 9:
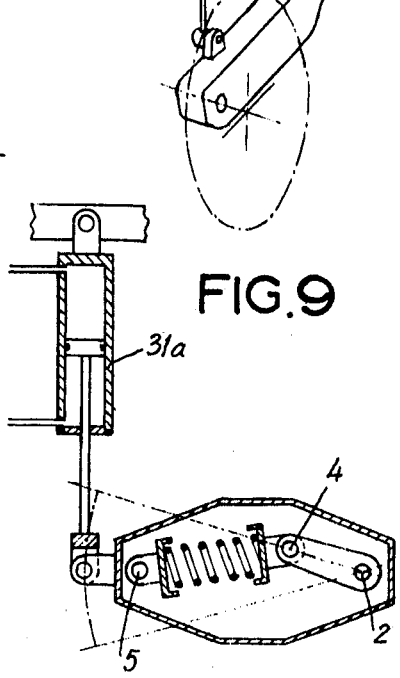

FIG. 9 illustrates a similar arrangement wherein a doubleacting hydraulic actuator of the cylinder and piston type 31a is substituted for the screw-rod and nut of the preceding arrangement. The actuator 31a is adapted to be operated in one or the other direction from any suitable device responsive to the suspension level.

Referring again to FIG. 11, and more particularly to the servomechanism of the arrangement illustrated therein, the pivot 47 is carried by one arm of a bellcrank lever 49 fulcrumed on pivot 42, the other arm of this lever carrying a nut 50 engaged by a screw rod 51 connected through a universal joint 52 to a rotary driving shaft 53.

This shaft is held against axial movement by a thrust bearing 54 and adapted to be rotatably driven from an electric motor 55 for adjusting the position of said pivot 47.

In a form of embodiment of the type illustrated in FIG. 12 the servomechanism may be common to both wheels of the train, i.e. comprise a single electric motor 55a driving in this case through a gearing 55b a shaft 53a having screw-threaded end portions 51a each engaging a nut (not shown) carried by the depending arm of bell crank lever 49a; if desired, this nut may be adapted to slide and swivel in this arm to accommodate possible relative movements of bell crank lever 41a with respect to its control shaft 53a.

Figure 14:
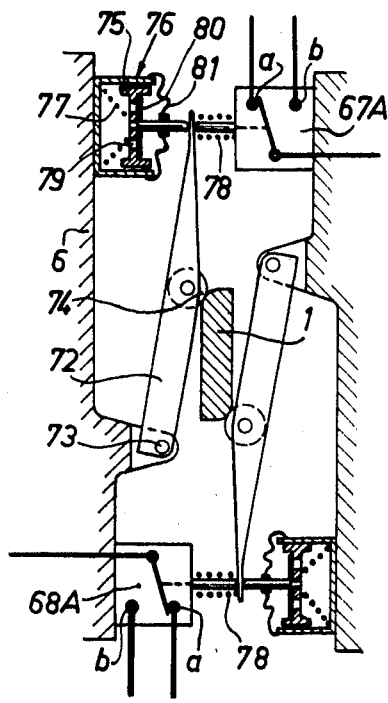
FIG. 14 is a detail view of a control circuit of the type illustrated in FIG. 13, with hydromechanical timelag means.
Figure 13:
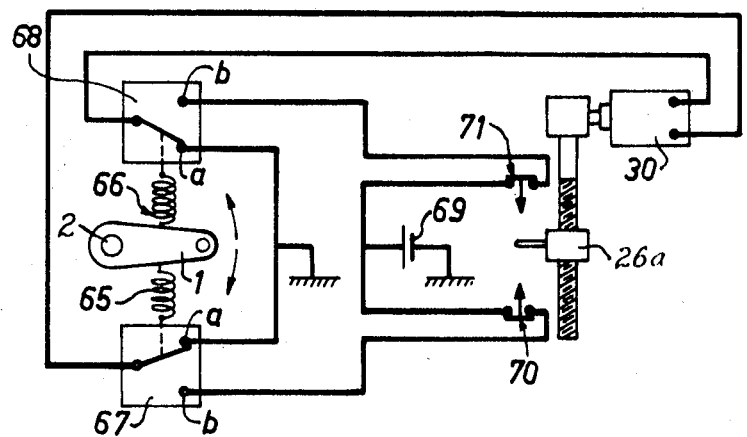
FIG. 13 is a diagrammatic view showing the layout of a circuit for controlling a servomechanism of the type illustrated in FIG. 8.
Figure 15:
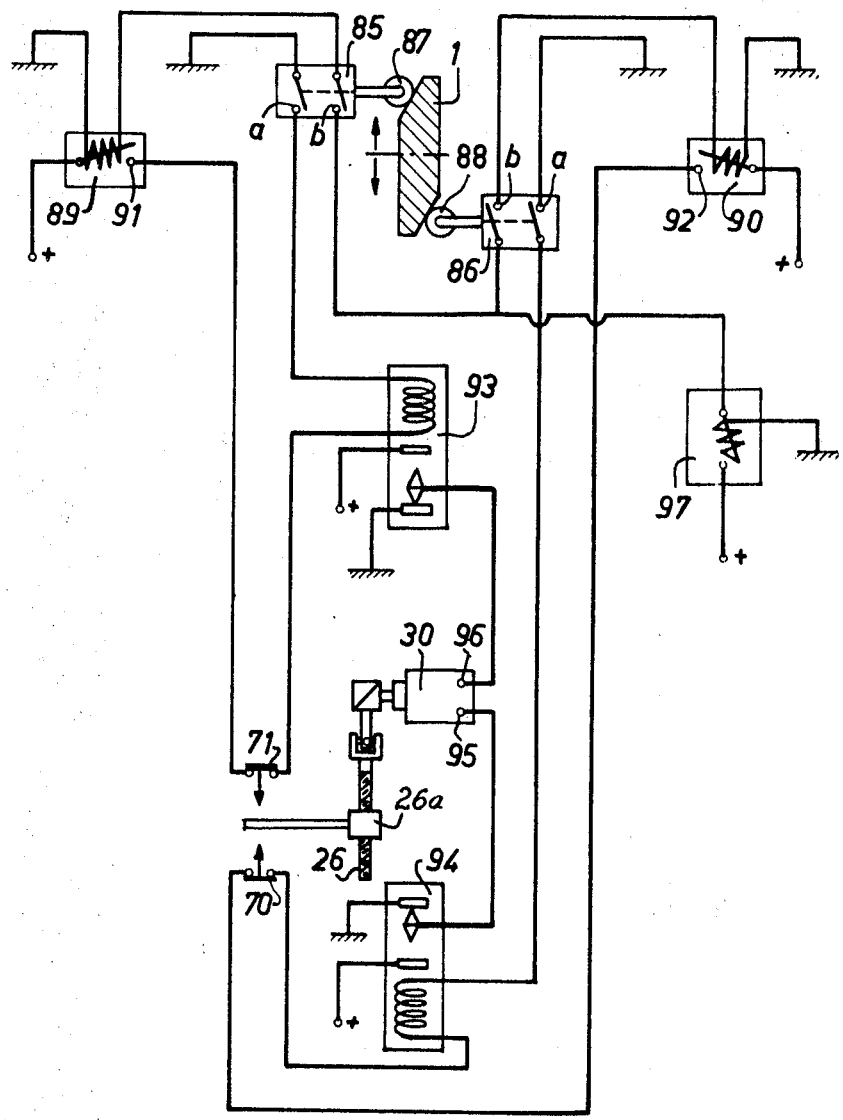
FIG. 15 is a diagrammatic view of a circuit for controlling the motor of a servomechanism of the same type, but with electrical timelag means.

FIG. 13 illustrates diagrammatically, in the case of an arrangement comprising a servomechanism of the type shown in FIG. 8, a circuit for controlling the motor 30, which may incorporate timelag means of the type illustrated in FIGS. 14 and 15.

The lever 1 is connected through tension springs 65, 66 to the movable contacts or blades of a pair of reversing switches 67, 68 to be considered herein as being secured to the corrector casing 6. These blades are connected to the energizing terminals of the motor and have their contacts $a$ connected to ground (as shown) or to the negative terminal of the source of current 69, the other contacts $b$ of these switches being connected to the positive terminals of this source through normally closed limit-switches 70, 71 of the servomechanism.

Thus, when the lever 1 is in its intermediate position, i.e. aligned with pivot 5, the movable contact blade of one of the two reversing switches engages the fixed contact $b$ and the motor 30 is energized and started in the direction to cause the nut 26a and therefore the pivot 5 to resume their position of alignment with respect to the lever 1, the polarities and therefore the direction of rotation of the motor being reversed according as one or the other switch closes its contact $b$.

The purpose of the limit switches 70 and 71 coacting with the nut 26a is to stop the motor 30 at the limit of the realignment obtained between predetermined maximum and minimum loads of the suspension, with the specific feature that when one limit switch is open the other remains closed, so that the nut 26a can move back at any time in the opposite direction.

In order to ensure the automatic operation of the servomechanism and to prevent its operation each time the suspension is deflected, some timelag means may advantageously be incorporated in the motor control circuit.

If on the one hand it is desired to avoid a pumping effect when the assembly is restored to its neutral position, this timelag must take place asymmetrically, that is, by introducing a timelag when the motor is started but allowing the motor to stop instantaneously when the lever 1 has resumed its neutral or aligned position. The delay thus introduced should be of the order of 10 to 20 seconds to avoid a correction from taking place during an acceleration or when the brakes are applied.

FIG. 14 illustrates, in a plane at right angles to the lever 1, a structure comprising a hydromechanical timelag system for controlling the reversing switches 67A and 68A having a function similar to that of the switches shown in FIG. 13.

In this example the lever 1 actuates the switches through the medium of levers 72 pivoted at 73 to the casing 6 and carrying each a roller follower 74 engaging the lever 1 formed to this end with a cam face or contour.

These levers 72 coact each with the rod of the piston 75 of an oil-filled dashpot 76, each dashpot piston being constantly urged by a spring 77 tending to press the lever 72 towards the lever 1, against the resistance of a weaker spring 78. On the other hand, each piston has orifices 79 formed therein which are normally closed by a diaphragm valve 80, and furthermore each piston is mounted with a certain clearance in the dashpot bore.

These dashpots 76 are filled with oil and sealed by flexible cylinder boots 81.

The device operates as follows: Assuming that the lever 1 moves upwards, the lever 72 corresponding to switch 67A will be easily moved to the left, the oil in the corresponding dashpot flowing through the orifices 79 and unseating the valve 80, so that the movable contact of switch 67A remains in engagement with the fixed contact $a$. Conversely, the other lever 72 corresponding to reversing switch 68A will also be allowed to move to the left due to the force of spring 77, but this movement is retarded by the oil filling the dashpot which cannot flow through the orifices 79 closed by valve 80 and must therefore flow through the annular gap left between the piston and its bore. Under these conditions, a certain time is necessary before the movable contact of reversing switch 68A engages its fixed contact $b$, this time being subordinate to the desired timelag to be introduced before the motor 30 is started.

When the lever 1 has resumed its neutral or intermediate position, i.e. in the desired alignment, its cam face will push to the right the lever 72 corresponding to reversing switch 68A, this movement taking place almost instantaneously since the valve 80 of the relevant dashpot is unseated and permits the free flow of oil through the orifices 79, whereby the movable contact of this switch is moved away from contact $b$ and the motor 30 is deenergized and stopped immediately.

FIG. 15 illustrates a modified form of embodiment of the circuit means controlling the motor 30 with the interposition of electrical timelag means which, in this example, is of the bimetal thermal type.

In this case, the lever 1 controls a pair of bipolar switches 85 and 86 by means of roller followers 87, 88 engaging cam faces of this lever 1.

These switches 85, 86 comprise on the one hand fixed contacts $a$ which, when engaged by the movable contact blades of said switches, are adapted to ground the windings of relays 93, 94 controlling the supply of energizing current to the motor, and on the other hand fixed contacts $b$ adapted to energize heating resistances of the bimetal thermal timelag devices 89, 90. These devices are so designed that when the bimetal is heated the corresponding contacts 91, 92 are closed after a time period of, say, 10 to 20 seconds, this contact closing being attended by the positive energization of the corresponding relays 93, 94 via limit switches 70, 71 of which the function has already been explained hereinabove.

This device operates as follows: if the lever 1 moves upwards, the roller actuator 87 of switch 85 closes both contacts $a$ and $b$. As a consequence of the closing of contact $b$, the resistance of timelag device 89 heats the bimetal which, after 10 to 20 seconds, will close the contact 91 controlling the energization of relay 93, since the winding thereof has already been grounded through contact $a$ and limit switch 71 is closed. The movable blade of relay 93 is attracted, thus connecting one terminal 96 of motor 30 to the positive terminal of the source of current (not shown), while the other motor terminal 95 remains grounded via the nonenergized front contact of relay 94.

When the motor 30 has restored the desired alignment with lever 1, the latter resumes the position shown in the drawing and is free from roller 87, so that both contacts $a$ and $b$ are open and the motor is stopped immediately as a consequence of the opening of the ground circuit of relay 93 at contact $a$, even if the heat inertia of the timelag device 89 delays the opening of contact 91 during a few seconds.

On the other hand, should voltage variations in the electric circuit of the vehicle be attended by undesired substantial changes in the timelag thus obtained, a simple voltage regulator 97 may be provided for energizing the two timelag devices under constant voltage conditions. The voltage regulator or stabilizer illustrated in FIG. 15 is of the simple bimetal thermal type, but it would not constitute a departure from the scope of the invention to use other types of regulators, for example the parallel connection of a nonlinear resistance of which the value decreases as voltage increases (which is generally referred to as V.D.R. or varistance) or alternately the series connection of a resistance having a positive temperature coefficient (usually referred to as a P.T.C. resistance).

Similarly, the time-lag divides 89 and 90 may be constructed according to various electrical or electronic techniques without departing from the scope of the invention.

It will be seen that the timelag control means described hereinabove are applicable to any electrical system contemplated for controlling the servomotor, even if this servomotor is not an electric motor but a device such as a double-acting hydraulic actuator of the cylinder and piston type as already mentioned hereinabove.

Thus, in the case illustrated in FIG. 14, it is only necessary for instance to insert, in the circuit containing the contacts $b$ of reversing switches 67A and 68A, a pair of single solenoid-operated valves adapted to deliver fluid to a chamber of said actuator and to exhaust said fluid from the other chamber thereof when contact $b$ is closed, and conversely to stop the aforesaid delivery of fluid and exhaust when this contact $b$ is open (to isolate the actuator), whereby the control will thus be delayed under the same conditions as in the preceding case (so that simple make-and-break switched can be used instead of reversing switches).

In the case illustrated in FIG. 15 it is only necessary to replace the relays 93, 94 by solenoid-operated valves each adapted likewise to deliver fluid to a chamber of said actuator and to exhaust the other chamber when the solenoid is energized, each valve discontinuing said delivery of fluid and said exhaust when it is not energized, so as to isolate the actuator.

FIG. 16 corresponds to a particular form of embodiment of servomechanism utilizing a hydraulic actuator, associated with hydraulic control means. This servomechanism comprises a double-acting hydraulic actuator of the cylinder and piston type, which in this specific arrangement consists of two opposite hydraulic cylinders 100 and 101 of the rolling diaphragm type, to avoid frictional contacts. These cylinders are connected through ducts 102 and 103 respectively to a hydraulic distributor 104 comprising a three-bearing slide valve 105 shown in its intermediate position in the figure, i.e. in the position wherein the central bearing portion closes the port of a feed duct 106, the end bearings closing the ports of exhaust ducts 107 and 108 respectively, with the aforesaid ducts 102 and 103 opening into the annular grooves 109 and 110 separating said bearing portions; therefore, in this portion, the cylinders are isolated. The slide valve is constantly urged to its intermediate position by a pair of antagonistic springs 111, 112 housed in two slide-valve control chambers 113 and 114 connected to said cylinders through ducts 115 and 116 leading to ducts 102 and 103, respectively.

The supply of hydraulic fluid under pressure to duct 106 is obtained by using a pump 117 and a nonreturn valve 118 having disposed upstream thereof and a bypass equipped with a safety valve 119 gauged at a pressure higher than the maximum pressure contemplated in the cylinders.

The pump 117 may consist, as shown by way of example, of an electric pump having its motor energized through either of a pair of pressure-responsive switches 120, 121 connected to the distributor through ducts 122, 123 respectively, these ducts 122 and 123 having their ports closed by the end bearing portions of slide valve 105 in the intermediate position thereof (the contacts of said switches being open in this case), and adapted to be connected to the corresponding slide valve control chamber 113 or 114 when the slide valve has been moved to either of its end positions (the control pressure applied to the slide valve then closing the switch contacts).

It will be noted that the operation of this flexibility corrector, as will be explained presently, does not require the use of members capable of detecting the alignment of pivots 2, 4 and 5 as in the preceding examples; in this arrangement, on the contrary, use is made of the fact that when these pivots are not aligned the case 6 receives from the spring 3 a torque producing a pressure differential in the cylinders 100 and 101 which is exploited for controlling the distributor slide valve and obtaining the desired regulation.

Assuming for example that the vehicle is stationary and the corrector is in the position shown in FIG. 16, when a variation takes place in the vehicle load the case 6 is subjected to a torque causing the application of a downward stress at point V, so that the pressure in cylinder 101 is greater than that prevailing in cylinder 100, and the fluid under pressure which is to be forced from cylinder 101 to control chamber 114 of distributor 104 will cause the slide valve 105 thereof to rise as seen in the drawing. The slide valve 105 thus caused to uncover the port of duct 123 controlling the closing of the pressure-responisve switch 121 and the energization of the electric motor driving the pump 117; furthermore, the slide valve 105 will cause the feed duct 106 to communicate through groove 110 with duct 103 of cylinder 101, and the duct 102 of cylinder 100 to communicate through groove 109 with the exhaust duct 107. Thus, the resulting filling of cylinder 101 with hydraulic fluid under pressure will cause the aforesaid point V and therefore the case 6 to move in the direction to restore the alignment of points 2, 4 and 5 of the corrector device. As the latter approaches this aligned condition, the pressure differential between cylinders 101 and 100 decreases until it is substantially zero when the alignment is obtained; therefore, when pivots 2, 4 and 5 are aligned the slide valve 105 is returned by springs 111 and 112 to its intermediate position, thus isolating again the cylinders 100 and 101 in the neutral condition of the corrector spring 3. Moreover, the return of slide valve 105 to its intermediate position is attended by a fluid leakage to the exhaust, thus reducing the fluid pressure in the pressure-responsive switch 121, so that this switch is open and the energization of the pump motor is discontinued.

To prevent the corrector from causing a recurrent oscillation of slide valve 105 in unison with the alternate movements of lever 1 connected to the suspension when the vehicle is started, throttling passages 124 are provided in the case of FIG. 1 in ducts 115 and 116 for damping out the corresponding alternate impulses resulting from the slide valve movements.

However, the timelag applied to the slide valve control should preferably be of the asymmetric type, in that the slide valve movement must be retarded outside the intermediate slide valve position, but its return to this position should take place freely in order to avoid any pumping effect, that is, any oscillation in the vicinity of the neutral condition.

FIG. 17 illustrates a typical example of means for applying a timelag to the slide valve according to the above-defined conditions, by using differential-action valves.

In this example, the slide valve 125 is urged to its intermediate position by springs 126, 127 engaging said valve through pistons 128, 129 respectively these pistons engaging shoulders 130 formed in the distributor body in the intermediate slide valve position. Each piston has orifices 131 formed therethrough which are partially closed by a valve member 132 on the control fluid inlet side, the ducts connected to this distributor being designated by the same reference numerals as in FIG. 16.

Thus, when as in the preceding example the cylinder 101 tends to force the hydraulic fluid through duct 116 into the distributor, the ingress of this liquid into the corresponding end of the distributor body is retarded by the constricted passage left by the portions of orifices 131 which are uncovered by slide valve 132, so as to produce the desired timelag in this direction. In contrast thereto, when the slide valve 125 is returned to its intermediate position by its spring 126 the slide valve will easily force the control liquid through these orifices 131 by unseating the valve 132, so that the return movement is desirably not retarded.

FIG. 18 corresponds to a simplified form of embodiment of the corrector utilizing an electrical servomechanism with manual control. The same elements 1 to 6 as described hereinabove are also shown in this Figure, the case 6 being connected by pivot means to a nut 26a engaged by a control screw rod 26 driven from an electric motor 30.

The electrical circuit for energizing this motor 30 comprises a source of current 133, contact means 134 to 136 for detecting the corrector position, a signal lamp 138 and a two-way reversing switch having an intermediate neutral position.

The movable contact 134 connected to lever 1 is adapted to engage segmentlike contacts 135, 137 carried by the case 6 and connected to the positive and negative terminals respectively of the source of current 133, these contacts being separated by a gap in which said movable contact 134 is positioned when pivots 2, 4 and 5 of the corrector are aligned. The movable contact 134 is electrically connected to one terminal of motor 30 and to one terminal of the signal lamp 138.

The reversing switch 139 comprises two contacts a and b of the manual selective closing type, which consist in this example of a pair of central blades connected to the other terminal of the motor and to the other terminal of the signal lamp 138, and a pair of external blades connected respectively to the positive and negative terminals of the source, said central blades being responsive to a manual control member 140 adapted to close contact a or contact b of the reversing switch 139.

Thus, the corrector is adapted to be adjusted by actuating a manual control with automatic stop at the desired position, as will be explained hereinafter, the driver having at his disposal for performing this adjustment on the one hand the hand lever 140 and the signal lamp 138 both mounted on the instrument panel of the vehicle which is shown diagrammatically by the board 141.

Before starting the vehicle the driver may first check the position of the corrector device with due regard to the momentary load, by actuating the hand lever 140 to close alternately the contacts $a$ and $b$ of reversing switch 139.

If the signal lamp 138 is not lighted this means that the detection contact 134 is located intermediate its companion contacts 135 and 136, so that it is not necessary to adjust the corrector.

If the signal lamp lights up in one of the closing positions of contacts $a$ or $b$ it means that the movable contact 134 engages one or the other of the segment-shaped contacts 135 or 136, and by keeping the corresponding contact 135 or 136 closed, the driver will cause the energization of the electric motor 30 with reverse polarities according as the signal lamp 138 lights up when contact $a$ is closed (with movable contact 134 engaging segment 135) or when contact $b$ is closed (contact 134 engaging segment 136). The direction in which the motor 30 drives the screw and nut mechanism 26E is so selected that it causes the return of the detection contact 134 to the gap formed between contacts 135 and 136, and when this return movement has been accomplished the motor will stop automatically and the signal lamp 138 will be put out, thus showing to the driver that the corrector is set for the momentary load and that he can release the hand lever 140.

To prevent this correction from taking place when the vehicle is running, a safety switch shown in diagrammatic form at 142 may also be inserted in the energizing circuit of motor 30, this switch opening when the vehicle is in motion and being for example of any known and suitable type, for example of the friction or tachometric type.

These different servomechanism arrangements are also applicable to the correctors shown in FIGS. 11 and 12; in this case, the arms 41 or 41a will be considered as the equivalent of lever 1, and the bellcrank levers 49 or 49a as the equivalent of the articulated case or support 6.

Of course, many modifications may be brought to the various forms of embodiment shown and described herein without departing from the spirit and scope of the invention as set forth in the appended claims.

We claim:

1. A flexibility corrector for a vehicle suspension system for reducing the suspension flexibility when the suspension system departs from its mean position and substantially working in a state of unstable equilibrium about said mean position of the suspension, said corrector comprising a triangular articulated structure formed by a first element having two spaced fixed pivot points, a second element pivotally mounted on one of said pivot points and a resilient member pivotally connected to the other of said pivot points and to the free end of said second element, said second element being responsive to the deflection and rebound movements of the suspension, and a servomechanism connected to said first element and having control means including means for detecting any deviation of said resilient member out of its state of unstable equilibrium so as to maintain said resilient member in said state in a static position of equilibrium of the suspension.

2. The flexibility corrector defined by claim 1 wherein said control means of the servomechanism are automatically effective and include timelag means coacting with said detection means for preventing the actuation of said servomechanism as a consequence of deviations caused by movements of the vehicle suspension during its operation.

3. A flexibility corrector as defined by claim 2 characterized in that said timelag means consist of hydraulic devices associated with a device for actuating a deviation detecting electric contact in order to introduce a timelag in the closing of said contact the actuating device proper being responsive to said mechanical detection members.

4. A flexibility corrector as defined by claim 2 characterized in that said timelag means are of the thermoelectric type comprising a bimetal disposed in series with a corresponding deviation detecting electric contact in the servomechanism control circuit, and an element capable of heating said bimetal which is adapted to be inserted in the energizing circuit by another deviation detecting electric contact associated with the preceding one.

5. The flexibility corrector as defined by claim 1 characterized in that said second element responsive to the deflection and rebound movement of the suspension consists of a lever rotatably solid with the central portion of an antiroll torsion bar interconnecting the two wheel suspensions of a same axle.

6. A flexibility corrector as defined by claim 1 characterized in that said servomechanism comprises a double-acting hydraulic actuator fed with hydraulic fluid from a slide-valve distributor responsive to pressure differentials in said actuator chambers.

7. A flexibility corrector according to claim 6, characterized in that said actuator comprises piston means and cylinder means forming a plurality of chambers, said distributor includes a slide-valve member and control chambers at opposite extremities of said slide-valve member, said actuator chambers of said actuator are being connected respectively to said control chambers, spring means constantly urging said slide-valve member to an intermediate position in which said actuator chambers are isolated, said slide-valve member also being movable to a position permitting the supply of hydraulic fluid to the actuator chamber having the major pressure and to exhaust the other actuator chamber, until the state of unstable equilibrium of said resilient member which corresponds to the equality in the pressures in said actuator chambers is restored.

8. A flexibility corrector according to claim 7, characterized in that throttling passages are provided in ducts between said actuator chambers and said control chambers for retarding the movement of said slide-valve member.

9. A flexibility corrector according to claim 7, characterized in that differential-action valves are provided between said actuator chambers and said control chambers, in order to introduce a timelag in the movement of said slide-valve member when it departs from its mean position but not when it returns thereto.

10. A flexibility corrector as defined by claim 1, characterized in that said servomechanism comprises an electric motor having inserted in its energizing circuit contacts adapted to energize said motor with a polarity according to the position of said deviation detecting contacts, said deviation detecting contacts having a neutral position in which said motor is deenergized.

11. A flexibility corrector according to claim 10, characterized in that said servomechanism further includes a signal lamp connected in parallel with respect to said motor.